United States Patent
Brockhurst et al.

(10) Patent No.: US 12,552,285 B2
(45) Date of Patent: Feb. 17, 2026

(54) SYSTEM AND METHOD OF EXITING A LOW POWER MODE FOR A BATTERY ELECTRIC MACHINE

(71) Applicant: Caterpillar Inc., Peoria, IL (US)

(72) Inventors: Russell A. Brockhurst, Carindale (AU); Ruchi P. Bhatia, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 187 days.

(21) Appl. No.: 18/394,160

(22) Filed: Dec. 22, 2023

(65) Prior Publication Data

US 2025/0206183 A1 Jun. 26, 2025

(51) Int. Cl.
*B60L 58/10* (2019.01)

(52) U.S. Cl.
CPC ........... *B60L 58/10* (2019.02); *B60L 2200/40* (2013.01); *B60L 2260/46* (2013.01)

(58) Field of Classification Search
CPC ... B60L 58/10; B60L 2200/40; B60L 2260/46
See application file for complete search history.

(56) References Cited

U.S. PATENT DOCUMENTS

| 4,229,688 | A | 10/1980 | Knox |
| 7,962,768 | B2 | 6/2011 | Grill |
| 9,745,723 | B2 | 8/2017 | Inoue |
| 10,919,163 | B1 * | 2/2021 | Li ........................... B60L 53/12 |
| 11,145,144 | B2 | 10/2021 | Manji |
| 11,400,823 | B1 | 8/2022 | Sampath et al. |
| 11,697,917 | B2 | 7/2023 | Myers |
| 12,229,598 | B2 * | 2/2025 | Ohtsuka .................... H04B 1/38 |
| 12,282,071 | B2 * | 4/2025 | Zou ........................ G01R 31/392 |
| 2018/0236663 | A1 * | 8/2018 | Cohen .................. G05D 1/0225 |
| 2019/0193711 | A1 | 6/2019 | Deshpande et al. |
| 2020/0142433 | A1 * | 5/2020 | Venturelli ................ G08G 5/34 |

FOREIGN PATENT DOCUMENTS

| CN | 207677499 | | 7/2018 |
| CN | 111322400 | A | 6/2020 |
| CN | 115520124 | A | 12/2022 |
| EP | 3034371 | B1 | 4/2021 |
| WO | 2018077315 | A1 | 5/2018 |

OTHER PUBLICATIONS

Written Opinion and International Search Report for Int'l. Patent Appln. No. PCT/US2024/055820, mailed Mar. 20, 2025 (31 pgs).

* cited by examiner

*Primary Examiner* — Gertrude Arthur Jeanglaude

(57) ABSTRACT

A system and method for exiting a low power mode of operation of a battery electric machine (BEM) are provided. The method includes determining a location of a BEM allocated to a production circuit; determining a location of a charging station compatible with the BEM; based on the locations of the BEM and the charging station and the production circuit: determining a plurality of tasks of the BEM for executing the production circuit, predicting a corresponding duration and a corresponding energy use of each of the plurality of tasks, and determining a sequence of the plurality of tasks; initiating the BEM to perform a next task after a current task of the plurality of tasks; and causing the BEM to exit a low power mode of operation of the BEM based on the predicted corresponding durations and the predicted corresponding energy uses of the current task and the next task.

20 Claims, 6 Drawing Sheets

SYSTEM AND METHOD OF EXITING A LOW POWER MODE FOR A BATTERY ELECTRIC MACHINE

TECHNICAL FIELD

The present disclosure relates generally to a system and method for managing battery energy of a machine, and more particularly, to a system and method for exiting a low power mode of operation of a battery electric machine.

BACKGROUND

When designing Battery Electric Machines (BEMs), an engineering trade-off may be made between battery weight and productive capacity. While heavier and larger batteries can store more energy, extra weight of the batteries reduces productive capacity, for example, an additional ton of battery weight on a haul truck reducing payload capacity of the haul truck by the same amount. Using smaller batteries may optimize productive capacity of a BEM where energy use of the BEM is predictable and the BEM may be charged just in time. However, the use of small batteries may be problematic where the energy use is not predictable.

BEMs are commonly charged at a charging station, and may be driven to the charging station and charged at the location of the charging station. BEMs consume energy while idle, systems such as battery cooling systems remain ready to work. There is a risk that, being required to stop or idle for extended periods, a BEM with small batteries will run out of energy during planned or unplanned stops, such as medical emergencies, extreme weather events, road closures, and/or queuing. Even where a BEM does not run out of energy during an extended stop, it may be left with insufficient energy to continue working, travel to the charge station, or queue at the charge station. To minimize energy use during extended idle periods, the BEM may enter a low power mode before returning to an active mode for beginning or resuming work.

One example of adjusting operating parameters of a machine in anticipation of a transition from a current operational state to a predicted subsequent operational state is disclosed in U.S. Pat. No. 11,697,917B2 of Myers et al., that was issued on Jun. 11, 2023 ("the '917 patent"). In particular, the '917 patent discloses an electronic controller receiving a data stream indicative of actuator settings, sensor outputs, and/or operator control settings; applying a pattern detection AI to determine a current operational state of the machine based on patterns detected in the data stream; applying a reinforcement learning to produce as an output one or more target operating parameters based on a predicted subsequent operational state of the machine; applying the one or more target operating parameters to the machine; and monitoring the performance metric of the machine.

Although useful in determining a current operational state of the machine, the electronic controller of the '917 patent may be limited. In particular, the '917 patent describes limited and repeated operational states of a lift-and-carry operation including lifting the material at a first location, traveling to a second location, releasing the material at the second location, and returning to the first location.

The systems and methods described herein are directed to addressing one or more of the drawbacks set forth above.

SUMMARY

According to a first aspect, a method includes determining a location of a battery electric machine (BEM) allocated to a production circuit; determining a location of a charging station compatible with the BEM; based at least in part on the location of the BEM, the location of the charging station, and the production circuit: determining a plurality of tasks of the BEM for executing the production circuit, predicting a corresponding duration of each task of the plurality of tasks, predicting a corresponding energy use of each task of the plurality of tasks, and determining a sequence of the plurality of tasks; initiating the BEM to perform a next task of the plurality of tasks after a current task of the plurality of tasks; and causing the BEM to exit a low power mode of operation of the BEM based in part on the predicted corresponding duration and the predicted corresponding energy use of the current task and the predicted corresponding duration and the predicted corresponding energy use of next task.

According to another aspect, a system is provided for exiting a low power mode of operation of a battery electric machine (BEM). The system includes a processor and a memory communicatively coupled to the processor. The memory stores thereon processor-executable instructions that, when executed by the processor, cause the processor to: determine a location of the BEM allocated to a production circuit; determine a location of a charging station compatible with the BEM; based at least in part on the location of the BEM, the location of the charging station, and the production circuit: determine a plurality of tasks of the BEM for executing the production circuit, predict a corresponding duration of each task of the plurality of tasks, predict a corresponding energy use of each task of the plurality of tasks including: segmenting the corresponding duration into a plurality of time intervals, predicting a corresponding segment energy use of each time interval of the plurality of time intervals, and determine a sequence of the plurality of tasks; initiate the BEM to perform a next task of the plurality of tasks after a current task of the plurality of task; and cause the BEM to exit a low power mode of operation of the BEM based in part on the predicted corresponding duration and the predicted corresponding energy use of the current task and the predicted corresponding duration and the predicted corresponding energy use of next task.

According to yet another aspect, non-transitory computer-readable medium is provided that stores thereon processor-executable instructions that, when executed by one or more processors of a system, cause the one or more processors to perform certain operations for exiting a low power mode of operation of a battery electric machine (BEM). The operations include determining a location of a battery electric machine (BEM) allocated to a production circuit; determining a location of a charging station compatible with the BEM; based at least in part on the location of the BEM, the location of the charging station, and the production circuit, determining a plurality of tasks of the BEM for executing the production circuit, predicting a corresponding duration of each task of the plurality of tasks, predicting a corresponding energy use of each task of the plurality of tasks including: segmenting the corresponding duration into a plurality of time intervals and predicting a corresponding segment energy use of each time interval of the plurality of time intervals, and determining a sequence of the plurality of tasks; initiating the BEM to perform a next task of the plurality of tasks after a current task of the plurality of tasks; and causing the BEM to exit a low power mode of operation of the BEM at an optimal time based in part on the predicted corresponding duration and the predicted corresponding energy use of the current task and the predicted corresponding duration and the predicted corresponding energy use of next task.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
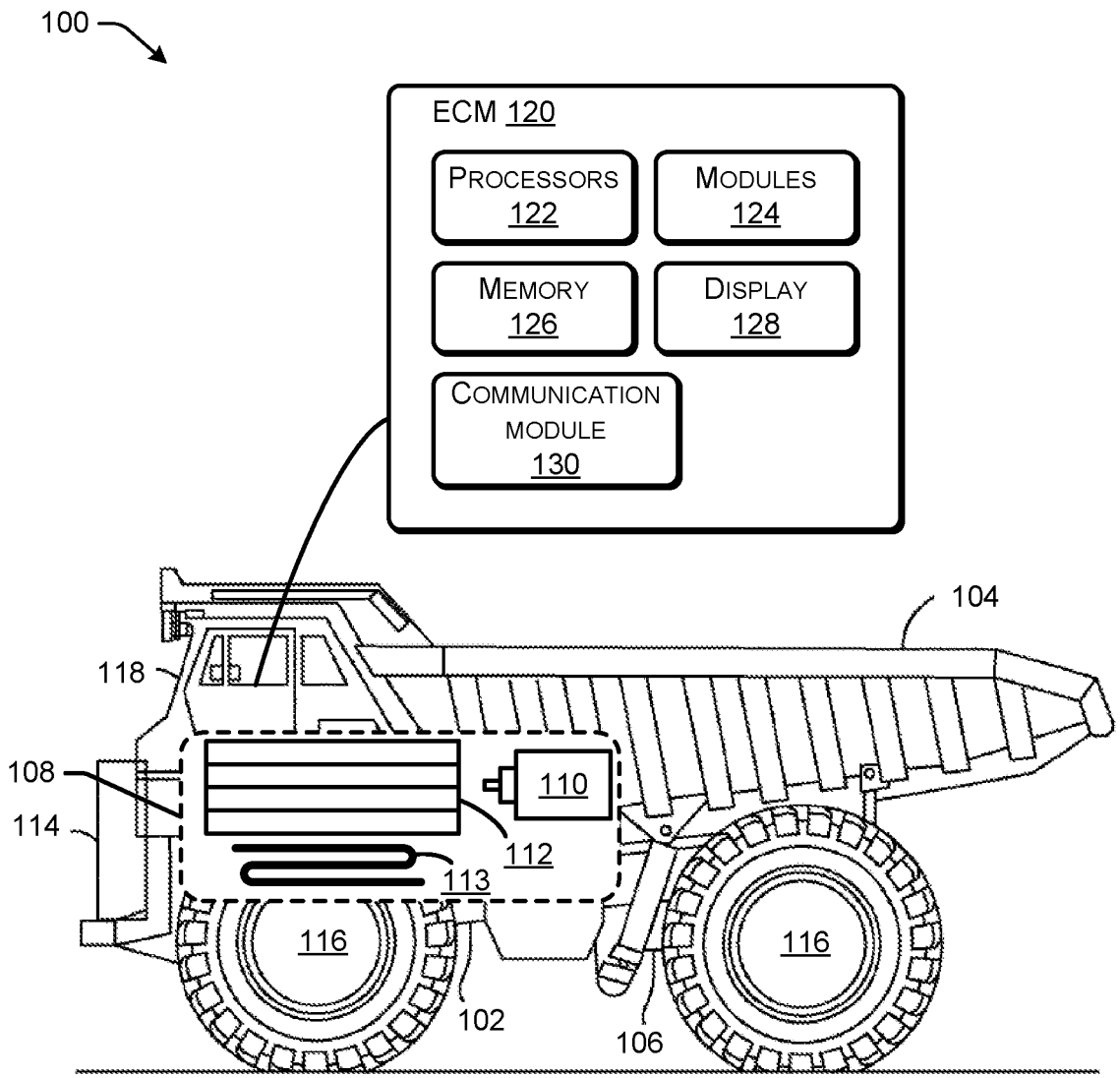
FIG. 1 is a side view of an exemplary machine that may utilize reserving power for a battery electric machine (BEM).

FIG. 1 is a side view of an exemplary battery electric machine (BEM) 100, according to one embodiment of the present disclosure. While the BEM 100 is depicted as a haul truck, it should be noted that the BEM 100 may include any type of battery electric machine, such as an automobile, a truck, an agricultural vehicle, an aircraft, a watercraft, and/or work vehicles, such as a track loader, a skid-steer loader, a grader, an on-highway truck, an off-highway truck, and/or any other machine known to a person skilled in the art.

The BEM 100 may include a chassis and/or a frame 102. A dump body 104 may be fixedly or pivotally mounted on the frame 102. The dump body 104 may be used for transportation of a payload of material like sand, gravel, stones, soil, excavated material, and the like from one location to another on a worksite on which the BEM 100 is deployed.

Hydraulic and/or pneumatic cylinders 106 may be mounted on the frame 102 and connected to the dump body 104 to enable movement in the form of tilting of the dump body 104 with respect to the frame 102 of the BEM 100. The tilting of the dump body 104 may result in the payload contained within the dump body 104 to be deposited on a ground surface behind the BEM 100. In some embodiments, the distance behind the BEM 100 that the payload is deposited may be determined and stored for more accurate positioning of the BEM 100 at a target position.

A powertrain or a drivetrain 108 (shown in a cutout) may be provided on the BEM 100 for the production and transmission of motive power. The powertrain 108 may include an electric motor 110 and one or more batteries 112. An enclosure 114 may be provided on the frame 102 of the BEM 100 which may house the electric motor 110, batteries 112, and a battery cooling system 113.

A set of ground engaging members 116, like wheels, may be provided to the BEM 100 for the purpose of mobility. The set of ground engaging members 116 may be steerable, or configured to turn, in order to turn the frame of the BEM 100 along a turning profile. In some embodiments, the front two ground engaging members 116 are configured to turn. The powertrain 108 may further include a torque convertor, transmission inclusive of gearing, drive shafts, propeller shaft, differentials, and other known drive links for transmission of motive power from the electric motor 110 to the at least one ground engaging member 116 in the plurality of ground engaging members 116. An operator cabin 118 may be provided on the BEM 100 which may house the various controls of the BEM 100.

For example, the BEM 100 may include an electronic control module (ECM) 120, with which the various controls of the BEM 100 may be performed. The ECM 120 may house one or more processors 122, which may execute any modules, components, or systems associated with the BEM 100, some of which may be housed in the ECM 120 as shown as modules 124. In some examples, the processors 122 may include a central processing unit (CPU), a graphics processing unit (GPU), both CPU and GPU, or other processing units or components known in the art. Additionally, each of the processors 122 may possess its own local memory, which also may store program modules, program data, and/or one or more operating systems. The ECM 120 may additionally include a user interface, such as a display 128 that displays various information and receives inputs via a touch-sensitive screen, and a communication module 130 to communicate with other BEMs or work vehicles on the worksite and a central office.

Computer-readable media, such as memory 126, associated with the BEM 100 may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the BEM 100. In some examples, one or more of the modules may include or be associated with computer-executable, or processor-executable, instructions that are stored by the computer-readable media and that are executable by one or more processors to perform such operations.

The BEM 100 may be configured to receive a task, such as to transport materials from one location to another at a worksite. The task, which is associated with a corresponding movement pattern of the BEM 100, may be received via the ECM 120. For example, the BEM 100 may maneuver to a first target position to receive a payload in its dump body 104 from an excavating machine, transport the payload to a second target position, and dump the payload at the second target position. Each of the first and second target positions may be associated with a target location for the BEM 100 and a target orientation for the BEM 100 (e.g., a heading direction for the BEM 100). Other example target positions may include parking spots, maintenance spots, refueling spots, any other pre-decided destination, and the like.

BEMs 100 may be manned machines, autonomous machines, and/or semi-autonomous machines. Human operators may operate, control, or direct some or all of the functions of manned or semi-autonomous machines. However, in examples in which the BEM 100 is autonomous or semi-autonomous, the speed, steering, work tool positioning/movement, and/or other functions of the BEM 100 may be fully or partially controlled automatically or semi-automatically by on-board or off-board controllers or other computing devices, such as computing devices with processors executing computer-readable instructions configured to control the BEM 100 autonomously or semi-autonomously.

Figure 2:
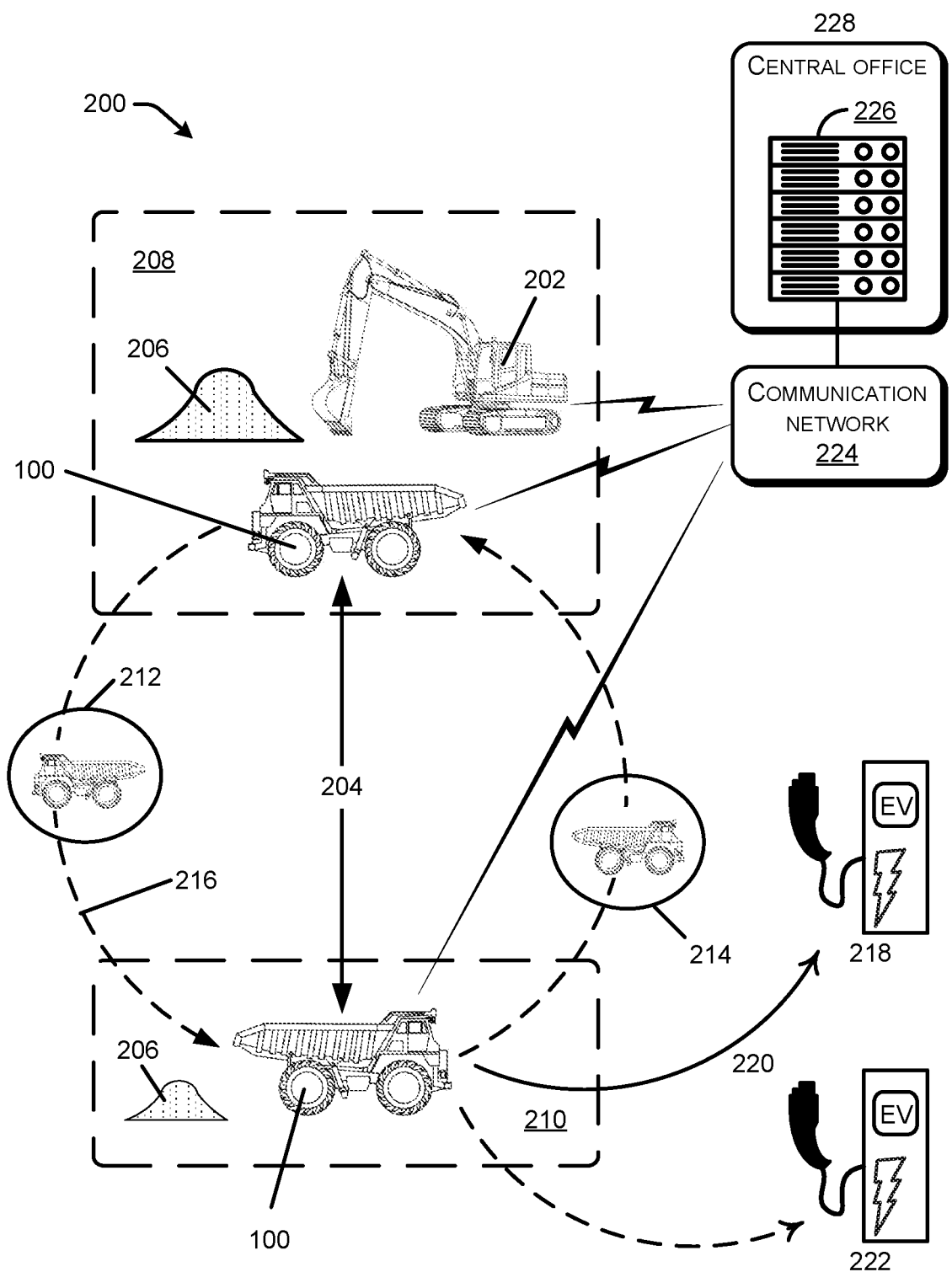
FIG. 2 is an example worksite where a set of machines are deployed.

FIG. 2 depicts an example worksite 200 where machines, such as BEMs 100 and 202 may be deployed. The worksite 200 may be a construction site, a mine site, a quarry, or any other type of worksite or work environment where one or more BEMs 100 and 202 may be deployed to perform one or more work tasks. In some examples, a worksite 200 may be considered to be a process site or a project site. In a process site, one or more machines may repeatedly perform a set of tasks. As an example, a process site may be a quarry or a mine site where the BEM 100 repeatedly moves rocks away from a rock face. In a project site, one or more BEMs 100 and 202 may perform different tasks as a project progresses over time. As an example, a project site can be a construction site, a paving site, or other work environment where the BEMs 100 and 202 perform different tasks as different stages of construction are reached. In other examples, the worksite 200 may have elements of both a process site and a project site.

As discussed above, the BEMs 100 and 202 on the worksite 200 may perform a variety of tasks. In some examples, the BEMs 100 may repeatedly perform a set of planned tasks associated with segments of a production circuit, where a planned task energy amount, i.e., an amount of energy required to perform each of the planned tasks or segments, is known, for example, from historical performance of the planned task, a heuristic algorithm for estimating the planned task energy amount, a simulation of the planned task, a stochastic model, or modeling, for the planned task, or a machine learning, including reinforcement learning, for the planned task. The set of planed tasks include active tasks and idle tasks.

A production circuit has an associated energy use profile (by segment) including nominal target charge range for charging, charge range for operation, reserve energy limit, and predicted energy use and/or gain. A production circuit is a sequence of activities to be performed by a machine one or more times, and where a production circuit is to be performed more than once, the production circuit may start and end at the same location or a different locations. During an active task, the BEM 100 may be performing a task that requires high power mode of operation, where various components of the BEM are engaged to perform the active task. For instance, an example simple production circuit may include a loading segment, a loaded transit segment, an unloading segment, and an unloaded transit segment. Such an example production circuit 204 is shown in FIG. 2, where the BEM 100 can be loaded with dirt or other material 206 at a loading zone 208 within the worksite 200, the BEM 100 can transport the material 206 from the loading zone 208 to a separate delivery zone 210 within the worksite 200, the BEM 100 can unload the material 206 at the delivery zone 210, and the BEM 100 can then travel back to the loading zone 208 to be loaded with more material 206 for a next iteration of the production circuit 204. During an idle period between two active tasks, such as loading/unloading the material 206 and traveling, the BEM 100 may enter a low power mode where power is supplied only to required or essential components of the BEM 100 for minimum functionality of the BEM 100. For example, while the BEM 100 is at rest during an idle period in the low power mode, the ECM 120 may continue receiving power to remain active for monitoring various functions, operations, and status of the BEM 100 and for communicating with other BEMs while the electric motor 110 powering the powertrain 108, the hydraulic cylinders 106, and the battery cooling system 113 may be turned off, i.e., by not receiving power. For example, where a haul truck, such as the BEM 100, may be sent to be loaded by a wheel loader, it may take ten to fifteen minutes for the BEM 100 to be loaded based on a payload of the BEM 100 being much larger compared to a bucket of the wheel loader. It may, therefore, be appropriate for the BEM 100 to enter the low power mode by shutting down some of its systems during this loading period. Where the BEM 100 is required to queue for the BEM 202 (the queuing being a task) and the length of the queuing period (the duration of the task) is not predicted to be long enough to warrant entering the low power mode, the BEM 100 may still enter the low power mode knowing that the BEM 100 is predicted to subsequently be idle for some time while being loaded. The BEM 100 may exit the low power mode at the end of the idle period to perform the next task.

In some examples, the BEM 100 may load and/or unload material 206 by itself during one or more segments of the production circuit 204. However, in other examples, the BEM 202 may load and/or unload material 206 for the BEM 100 during the production circuit 204. For instance, an excavator or other loading machine can be positioned at a loading zone 208 and be configured to load material 206 onto trucks, such as the BEM 100, which can then transport the material 206 to one or more delivery zones 210. In some examples, such trucks may themselves dump or otherwise deliver the material 206 at delivery zones 210. However, in other examples, another excavator or other type of unloading machine can be positioned at a delivery zone 210 to unload material 206 from trucks.

Other examples of a production circuit include, but not limited to: a complex circuit—starting at a first loading tool, loading, travelling to a dump, dumping, travelling to a second loading tool, loading, travelling to a lime silo, receiving a dose of lime, travelling to a second dump, dumping, returning to the first loading tool; watering— travelling to a location, watering a road, watering another road, travelling, watering a plan area, traveling, watering another road, travelling to a water refill station; grading— travelling to a location, grading, travelling to another location, grading, travelling to a park up; and wheel loader— travelling to a location, loading trucks, travelling to a location, cleaning up a dump, travelling to a location, repairing a road, travelling to a location, loading trucks.

More than one BEM 100 may follow the same production circuit 204 on the worksite 200. For instance, in the example shown in FIG. 2, a first truck may be being loaded with material 206 at the loading zone 208 at the same time a previously-loaded second truck may be unloading material 206 at a delivery zone 210. Similar trucks already loaded with material 206 may be in transit from the loading zone 208 to the delivery zone 210, and may for example be located at a first position 212. Other trucks may have finished delivering loads of material 206 and be in transit from the delivery zone 210 back to the loading zone 208, and may for example be located at a second position 214.

Accordingly, BEMs 100 that are performing the same production circuit 204 may move along substantially the same route 216 through the worksite 200 as they perform and transition between different segments of the production circuit 204. Additionally, a BEM 100 may perform substantially the same operations as other BEMs 100 when the BEM 100 are at the same or similar locations along the route 216 through the worksite 200. As an example, when a production circuit 204 involves BEMs 100 (haul trucks) moving from the loading zone 208 to a delivery zone 210, each BEM 100 may be likely to perform the same or similar operations associated with dumping material 206 when they reach the delivery zone 210, even though individual BEMs 100 may arrive at the delivery zone 210 at different times. At some point in time after performing the production circuit 204, as a part of the planned tasks, the BEM 100 will need to be recharged, and may travel to a closest charging station 218 along a predetermined route 220. Additionally, or alternatively, another route for the BEM 100 to reach a second closest charging station 222 may be provided.

In some examples, the BEM 100 on the worksite 200 may communicate via a communication network 224 with a computing system 226, such as a computer, server, or other computing element in a central office 228 located away from the BEM 100. For example, the communication network 224 may be a cellular network, Wi-Fi® network, or any other type of network. In some examples, the BEM 100 may use the communication network 224 to report location data and/or other types of data to the computing system 226, such that the computing system 226 may track the location of the BEM 100 on the worksite 200, and the computing system 226 may communicate data and instructions to the BEM 100 via the communication network 224.

The BEM 100 may be one of a plurality of BEM on the worksite 200, and the computing system 226 in the central office 228 perform a site-wide optimization and assign each BEM a predicted idle time and a predicted return to work time, or a predicted start time and a predicted end time of a task of a plurality tasks. These assignments may include predicted energy use for some period after the machine returning to work, for example, a plurality of time intervals of the same or different length in time and an associated energy use for each interval. The computing system 226 and the ECM 120 may use heuristic and/or machine learning to determine when to exit the low power mode. The sequence in which individual machines return to work may be optimized to maximize productivity, minimize total energy use, minimize battery damage, and minimize queuing. For example, if a group of machines in the low power mode all needed to be charged at the same charging station, such as the charging station 218, the computing system 226 may stagger their startup times to avoid queuing at the charging station 218.

The computing system 226 or an onboard system of the BEM 100, such as the ECM 120 may use heuristics algorithms and/or machine learning to determine the optimal time to start exiting the low power mode. The optimal time may allow the BEM 100 to be ready to work just in time while minimizing total energy use. The use of machine learning may minimize startup time, minimize energy use, and minimize battery damage over the startup period and some period of initial operation. For example, the optimal outcome may be to restart operations before the BEM 100 reaches optimal operating conditions where energy use after startup is expected to be low or moderate. Various machine states may be used for training including ambient temperature, battery temperature, battery health, charge capacity, data from other machine sensors, information from nearby machines via the central office 228 or peer-to-peer communications, machine performance history, predicted energy use, and the like.

If the BEM 100 has entered the low power mode in an area with limited network coverage with no connection to the central office 228, the onboard systems of the BEM 100, such as the ECM 120, may use peer-to-peer communications with nearby machines to control exiting from the low power mode. For example, a machine in proximity to the BEM 100 may instruct the BEM 100 to exit the low power mode, and an operator, an operator assisted loading tool, or an automated loading tool, may instruct a group of machines queuing nearby to exit the low power mode. The group of machines instructed to exit the low power mode may use heuristics algorithms and/or machine learning to negotiate an optimal start up sequence. Such a loading tool may instruct the BEM 100, a haul truck, to a particular location for loading or inform nearby machines, such as other haul trucks, that the BEM 100 is going to be delays for an extended period of time. During the extended delay, the other haul trucks nearby may be diverted to an alternative activity. For a group of machines are queuing at a dump, they may negotiate a startup sequence based on predicted service times, i.e., time interval to service each machine. Various machine states may be used for training in machine learning including location via GPS, travel constraints, such as no passing, predicted startup times, charge capacity, data from other machine sensors, information from nearby machines via peer-to-peer communications, machine performance history, priority of assigned work, and the like. For example, priority may be given to machines working on a specific task over other tasks, such as feeding a saturated Loading Tool, or feeding a Crusher. The use of machine learning may minimize startup time, minimize energy use, minimize battery damage, maximize compliance to plan, and maximize productivity.

Figure 3:
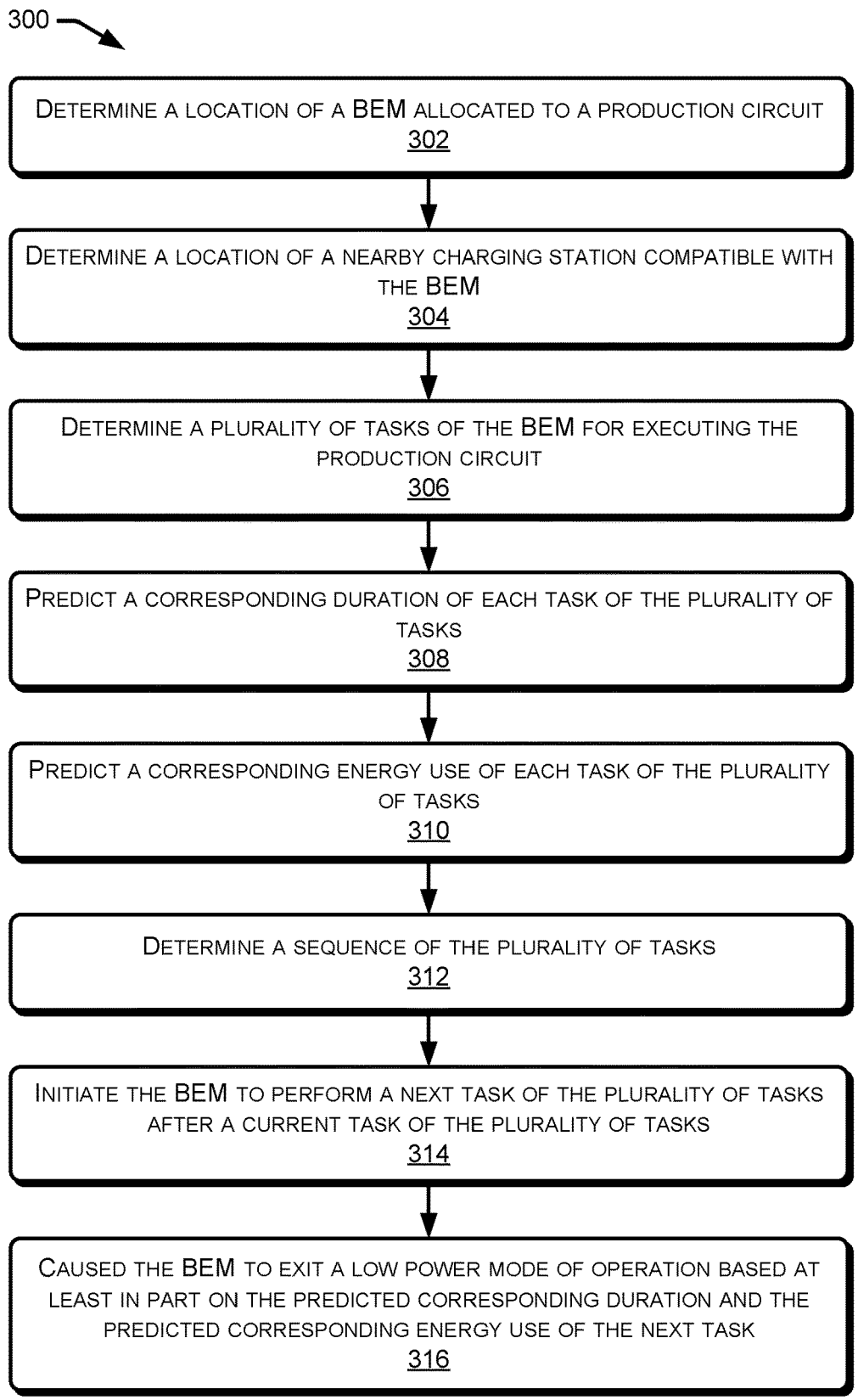
FIG. 3 is a flowchart illustrating a process for exiting a low power mode of operation for a BEM.

FIG. 3 is a flowchart 300 illustrating a process for exiting a low power mode of operation for a battery electric machine (BEM). The flowchart 300 is illustrated as a logical flow graph, with reference to FIG. 2, operation of which represents a sequence of operations that can be implemented in hardware, software, or a combination thereof.

At block 302, a location of the BEM 100 allocated to the production circuit 204 may be determined. For example, the one or more processors 122 of the ECM 120 of the BEM 100 and/or the computing system 226 of the central office 228 may determine the location by utilizing global positioning system (GPS) data associated with the BEM 100. The BEM 100 may be a representative BEM instead of a particular individual BEM. At block 304, a location of a nearby charging station compatible with the BEM, such as the charging station 218 may be determined. Additionally, or alternatively, a location of another, or an alternate, nearby charging station 222 may also be determined. The locations of the charging stations may also be obtained from a database of the computing system 226. Additionally, or alternatively, the locations of the BEM 100 and charging stations 218 and 222 may be determined, or obtained, by utilizing a non-GPS based process or technique, such as a landmark based location/localization (LBL) navigation and a perception based location (PBL) navigation which determine locations by observing known landmarks, and possibly including markers or targets, or a Ground Sensing Location (GSL) navigation where radar, or other detection techniques, is used to determine location based on known ground anomalies.

At block 306, a plurality of tasks of the BEM 100 for executing the production circuit 204 may be determined including a travel by the BEM 100 from the current location to the charging station 218 along the predetermined route 220. A corresponding duration of each task of the plurality of tasks may be predicted at block 308, which may include a corresponding start time and a corresponding end time of each task of the plurality of tasks. At block 310, a corresponding energy use of each task of the plurality of tasks may be predicted. The corresponding duration may be further segmented to a plurality of time intervals of the same or different length in time, and an associated energy use during each interval may be predicted. For example, the associated energy usages may include the energy predicted to be used by the BEM 100 in the next minute, two minutes, five minutes, ten minutes, twenty minutes and thirty minutes, or longer, and may additionally predict how much work the BEM 100 may be performing during those time intervals and predict a corresponding segment energy use of each time interval, i.e., how much energy is used during those time intervals. Additionally, or alternatively, predicting the corresponding energy use of each task of the plurality of tasks may include predicting a predicted start time and a predicted end time corresponding to each task of the plurality of tasks. The corresponding energy use and the corresponding duration of each task of the plurality of tasks may be predicted based at least in part on a behavior of an operator of the BEM 100. For example, a certain operator may be more experienced and more efficient, thus typically uses less energy, over other operators. Another operator may be efficient on particular tasks, thus taking less time for these particular tasks, over other tasks.

As described above with reference to FIG. 2, the plurality of tasks, i.e., one or more planned tasks may include one or more routine tasks of the BEM 100 associated with executing the production circuit 204 with known energy amount requirements to complete the one or more routine tasks and a number of repetitions of the one or more routine tasks to be performed by the BEM 100. Such a known set of task energy amounts or uses may be referred as an energy use profile for the production circuit. For example, the computing system 226 of the central office 228 may provide an energy use profile for the production circuit to the BEM 100. The plurality of tasks may include loading and/or unloading material, transporting the material 206 to one or more delivery zones, dumping/delivering the material at delivery zones, watering at a location, traveling to a refilling station, refilling water at traveling station, grading, traveling to another location, grading, travelling to a park up, and others like. Additionally, a plurality of alternative tasks of the BEM 100 in an alternative production circuit may be determined, and an alternate task energy amount associated with the plurality of alternative planned tasks including a travel to the charging station 218 in the alternative production circuit may be determined. The BEM 100 may perform the plurality of alternative planned tasks in the alternative production circuit in case entry criteria for the production circuit 204 are not met, for example, the BEM 100 being loaded with unexpected material but able to perform in the alternative production circuit. As described above with reference to FIG. 2, a task energy amount, i.e., an amount of energy required to perform each of the plurality of tasks, may be known, for example, from historical performance of the task by the BEM 100 associated with the production circuit 204, a heuristic algorithm for estimating the corresponding energy use of each task of the plurality of tasks, a simulation of the plurality of tasks for estimating the corresponding energy use of each task of the plurality of tasks, a stochastic model for estimating the corresponding energy use of each task of the plurality of tasks, and/or a machine learning for estimating the corresponding energy use of each task of the plurality of tasks. Additionally, or alternatively, the corresponding duration of each task of the plurality of tasks may be predicted using a heuristic algorithm for estimating the corresponding duration of each task of the plurality of tasks, a simulation of the plurality of tasks for estimating the corresponding duration of each task of the plurality of tasks, a stochastic model for estimating the corresponding duration of each task of the plurality of tasks, and/or a machine learning for estimating the corresponding duration of each task of the plurality of tasks.

At block 312, a sequence of the plurality of tasks may be determined, and the BEM 100 may be initiated to perform a next task of the plurality of tasks after a current task of the plurality of tasks at block 314. At block 316, the BEM 100 may exit, or may be automatically caused to exit, a low power mode of operation of the BEM 100 based at least in part on the predicted corresponding duration and the predicted corresponding energy use of the next task. As discussed above with reference to FIG. 2, in the low power mode, power is supplied only to required or essential components of the BEM 100 for minimum functionality of the BEM 100. For example, while the BEM 100 is at rest during an idle period in the low power mode, the ECM 120 may continue receiving power to remain active for monitoring various functions, operations, and status of the BEM 100 and for communicating with other BEMs while the electric motor 110 powering the powertrain 108, the hydraulic cylinders 106, and the battery cooling system 113 may be turned off, i.e., by not receiving power.

Figure 4:
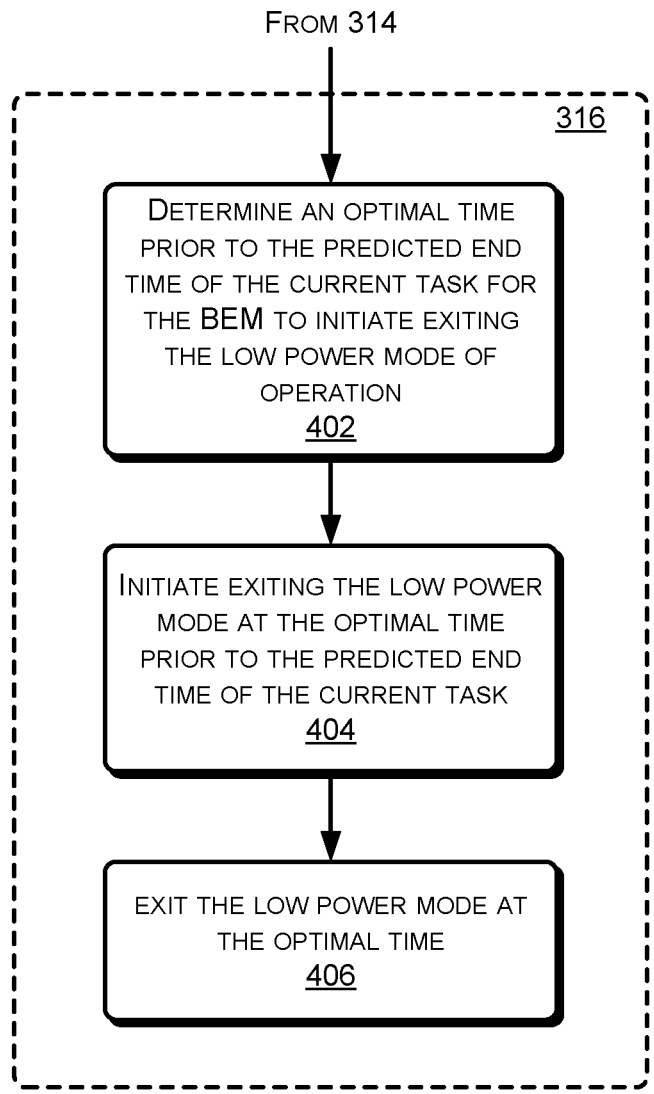
FIG. 4 is a flowchart representing an example detail process of one of the blocks of FIG. 3.

FIG. 4 is a flowchart representing an example detail process of block 316 of FIG. 3. At block 402, an optimal time prior to the predicted end time of the current task for the BEM 100 to initiate exiting the low power mode of operation may be determined. Exiting the low power mode at the optimal time prior to the predicted end time of the current task may provide several advantages. For example, a startup time period between the optimal time and the predicted start time of the next task to prepare the BEM 100 for the active task may be minimized (minimal startup time period), which may increase productivity of the BEM 100 by minimizing the downtime. During this minimal startup time, the batteries 112 may be warmed up and the hydraulic cylinders 106 may be primed, etc., so that the BEM 100 is ready to begin the next task at the predicted start time of the next task. Additionally, or alternatively, energy use during the startup time, i.e., a time period between the optimal time and the predicted start time of the next task, may be minimized (a minimal energy use during the startup time) by bringing up the components of the BEM 100 required for the next task to sufficiently acceptable conditions, i.e., without over-preparing the required components. Further, the optimal time may be determined to provide a minimal damage to the batteries 112 during the startup time.

The optimal time may be determined based at least in part on the predicted corresponding energy use of the next task and/or one or more machine states of the BEM 100, where data and/or information associated with the one or more machines states some may be obtained from sensors of the BEM 100 that monitor various functions and/or states of the BEM 100 and components of the BEM 100. The one or more machine states may include ambient temperature, temperature of batteries 112 of the BEM 100, health of the batteries 112, charge capacity of the BEM 100, information from machines near the BEM 100, performance history of the BEM 100, predicted energy use by the BEM 100 between the optimal time and the predicted end time of the current task, and the like. The optimal time may be determined using at least one of a heuristic algorithm for estimating the optimal time based on one or more machine states of the BEM 100, a simulation of the optimal time based on one or more machine states of the BEM 100, a stochastic model for estimating the optimal time based on one or more machine states of the BEM 100, or a machine learning for estimating the optimal time based on one or more machine states of the BEM 100. At block 404, the BEM 100 may initiate, or may be caused automatically to initiate, exiting the low power mode at the optimal time prior to the predicted end time of the current task, and exit, or may be caused automatically to exit, the low power mode at the optimal time at block 406.

Figure 5:
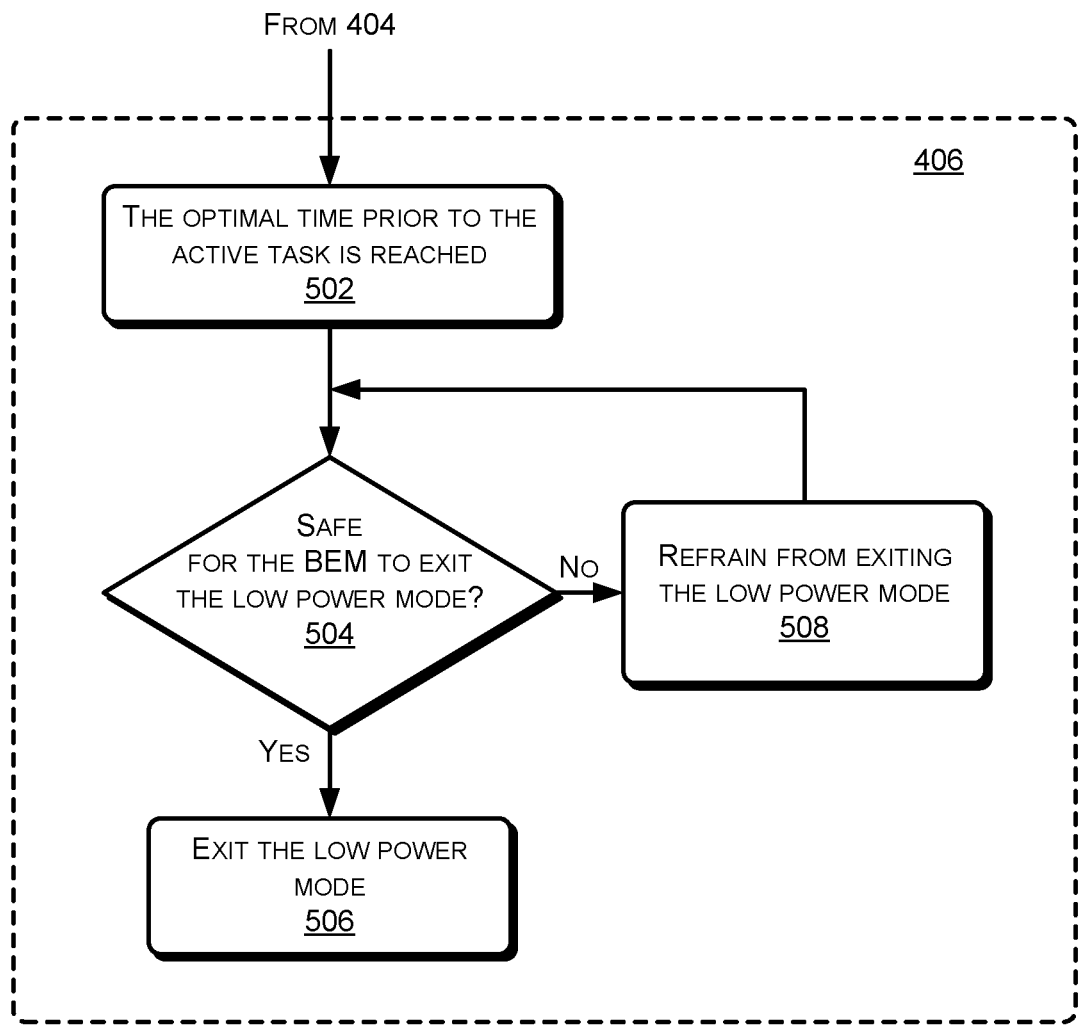
FIG. 5 is a flowchart representing an example detail process of one of the blocks of FIG. 4.

FIG. 5 is a flowchart representing an example detail process of block 406 of FIG. 4. At block 502, the optimal time is reached, and whether it is safe for the BEM 100 to exit the low power mode is determined at block 504. For example, the BEM 100 may monitor its surrounding for any obstacles In response to determining that it is safe for the BEM 100 to exit the low power mode at block 504 ("YES" branch), the BEM 100 may exit, or may be cause to exit, the low power mode at block 506. However, in response to determining that it is not safe for the BEM 100 to exit the low power mode at block 504 ("NO" branch), the BEM 100 may refrain, or may be cause to refrain, from exiting the low power mode at block 508. For example, it may not be safe for the BEM 100 to exit the lower power mode and start performing the next task by moving forward if there is now an obstacle, such as a vehicle, another BEM, or a person, present nearby in the path of the BEM 100. Additionally, or alternatively, the BEM 100 may delay, or may be cause to delay, exiting the low power mode at block 508 until it is determined to be safe for the BEM 100 to exit the low power mode. For example, the BEM 100 may continue operating in the low power mode till the obstacle is removed from the path of the BEM 100, i.e., it is determined at block 504 that it is safe for the BEM 100 to exit the low power mode.

The processes described above with reference to FIGS. 4 and 5 may be combined and performed in parallel or in series. Additionally, or alternatively, the processes described above with reference to FIGS. 4 and 5 may be overridden by an operator of the BEM 100 directly at the BEM 100 or remotely via the computing system 226 of the central office 228.

Figure 6:
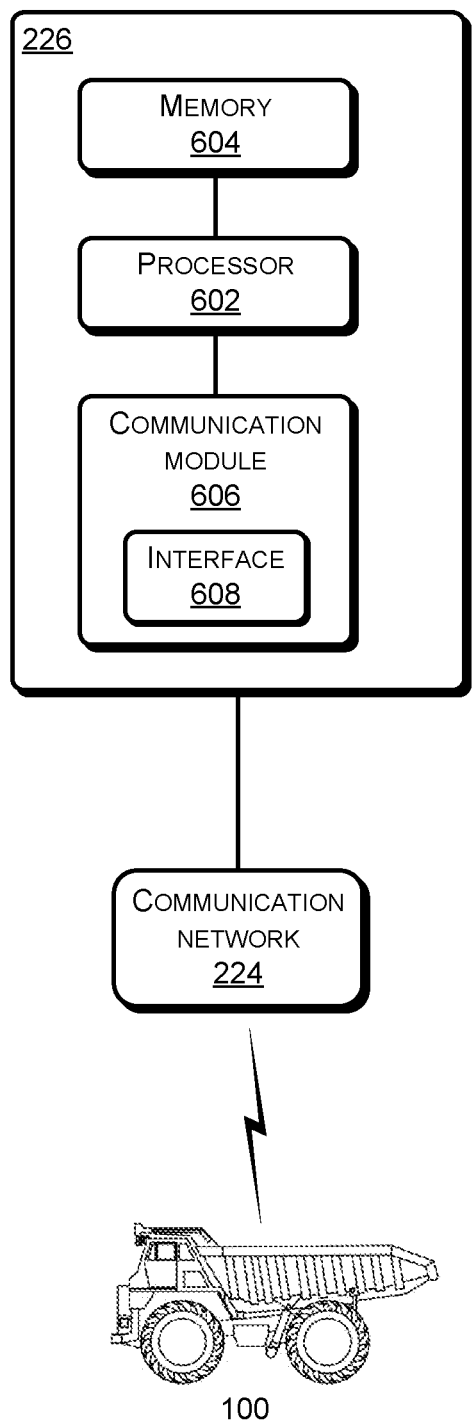
FIG. 6 is a block diagram of a computing system for directing a BEM to exit a low power mode.

FIG. 6 is a block diagram of the computing system 226 for directing a BEM, such as the BEM 100, to exit a low power mode. For the purpose of discussion, unless otherwise specified, FIG. 6 will be described below with respect to the processor 602 of the computing system 226 performing the method and steps described above with reference to FIGS. 2-5. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the process. The computing system 226 may also embody single or multiple microprocessors, field programmable gate arrays (FPGAs), digital signal processors (DSPs), programmable logic controllers (PLCs), etc.

The computing system 226 may be hosted by a single server or distributedly hosted by a plurality of servers in a cloud environment. The computing system 226 may comprise the processor 602, a memory 604 communicatively coupled to the processor 602, and a communication module 606 communicatively coupled to the processor 602. The communication module 606 may include an interface 608, such as a user interface and input/output (I/O) module capable of receiving inputs and providing outputs. The inputs and outputs may be communicated to and from the communication module 606 via the communication network 224. As described above with reference to FIG. 2, the communication network 224 may be a cellular network, Wi-Fi® network, or any other type of network. In some examples, the BEM 100 may use the communication network 224 to report location data and/or other types of data to the computing system 226, such that the computing system 226 may track the location of the BEM 100 on the worksite 200, and the computing system 226 may communicate data and instructions to the BEM 100 via the communication network 224.

In some examples, the processor 602 may include a central processing unit (CPU), a graphics processing unit (GPU), both CPU and GPU, or other processing units or components known in the art. Additionally, the processor 602 may possess its own local memory, which also may store program modules, program data, and/or one or more operating systems. The memory 604 may comprise computer-readable media, which may include volatile memory (e.g., RAM), non-volatile memory (e.g., ROM, flash memory, miniature hard drive, memory card, or the like), or some combination thereof. The computer-readable media may be non-transitory computer-readable media. The computer-readable media may include or be associated with the one or more of the above-noted modules, which perform various operations associated with the computing system 226. In some examples, one or more of the modules may include, or be associated with, computer-executable instructions that are stored by the computer-readable media and that are executable by one or more processors to perform such operations. For example, the memory 604 may store processor-executable instructions that, when executed by the processor 602 of the computing system 226, cause the processor 602 to perform operations for directing a BEM, such as the BEM 100, to operate in a low power mode as described above with reference to FIGS. 2-5.

The software and or functionality of the system(s), component(s), algorithms, cloud(s), platform(s), etc., discussed above with reference to FIGS. 2-5 regarding directing a BEM, such as the BEM 100, to operate in and exit a low power mode, may be combined in different ways depending on design requirements, ease of construction and/or integration, cost, etc. Accordingly, while these elements have been separated for purposes of discussion, they may be combined, as appropriate, during implementation.

The computing system 226 may be configured to use artificial intelligence for maintaining synchronization between centralized (cloud-based) and distributed models. The computing system 226 may include a centralized or cloud-based computer processing system located in one or more of a back-office server or a plurality of remote servers, one or more distributed, edge-based computer processing systems separately located with each of the distributed computer processing systems communicatively connected to the centralized computer processing system.

A machine learning engine may be included in at least one of the centralized and distributed computer processing systems, such as the computing system 226. The machine learning engine may train a learning system using the training data to enable the machine learning engine to safely mitigate a divergence discovered between first and second sets of output control commands using a learning function including at least one learning parameter. Training the learning system may include providing the training data as an input to the learning function. The learning function may be configured to use the at least one learning parameter to generate an output based on the input, cause the learning function to generate the output based on the input, and compare the output to one or more of the first and second sets of output control commands to determine a difference between the output and the one or more of the first and second sets of output control commands. The learning function may modify the at least one learning parameter and the output of the learning function to decrease the difference responsive to the difference being greater than a threshold difference and under a variety of different conditions.

INDUSTRIAL APPLICABILITY

The example systems and methods of the present disclosure are applicable for exiting a low power mode of operation for a battery electric machine (BEM), such as an automobile, a truck, an agricultural vehicle, an aircraft, a watercraft, and/or work vehicles, such as a track loader, a skid-steer loader, a grader, an on-highway truck, an off-highway truck, and/or any other machine known to a person skilled in the art. The systems and methods described herein may be used to cause the BEM allocated to a production circuit to exit the low power mode of operation at an optimal time to minimize total energy use, minimize battery damage, and to achieve maximum productivity as it ensures that machines stay active for only the needed, or minimum, period of time, that is, when the machine is likely to be performing productive, or active, task necessitating a high-power state where the machine, such as the BEM, may be actively drawing a significant amount of power from the batteries of the BEM. Generally, the BEM may be maintained in the low power mode subject to certain criteria, which may be learned and refined heuristically based on real world data and conditions by machine learning algorithms having the objective of further reduction of energy use during subsequent iteration. Some examples may include optimizing the number of entries and exits of the BEM in and out of the low power mode to minimize effects on the battery life, and having the ML determine the current state of the BEM and adopt a strategy based on priority and/or ranking of tasks to be performed by the BEMs.

For example, computing system determines a location of the BEM and a location of a nearest charging station compatible with the BEM, and based at least in part on the location of the BEM, the location of the charging station, and the production circuit, determines a plurality of tasks of the BEM for executing the production circuit, predicts a corresponding duration of each task of the plurality of tasks, predicts a corresponding energy use of each task of the plurality of tasks, and determine a sequence of the plurality of tasks. Predicting the corresponding energy use of each task of the plurality of tasks includes segmenting the corresponding duration into a plurality of time intervals, and predicting a corresponding segment energy use of each time interval of the plurality of time intervals. The computing system initiates the BEM to perform a next task of the plurality of tasks after a current task of the plurality of tasks, and causes the BEM to exit a low power mode of operation of the BEM based in part on the predicted corresponding duration and the predicted corresponding energy use of the current task and the predicted corresponding duration and the predicted corresponding energy use of next task.

Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

While aspects of the present disclosure have been particularly shown and described with reference to the examples above, it will be understood by those skilled in the art that various additional embodiments may be contemplated by the modification of the disclosed devices, systems, and methods without departing from the spirit and scope of what is disclosed. Such embodiments should be understood to fall within the scope of the present disclosure as determined based upon the claims and any equivalents thereof.

What is claimed is:

1. A method, performed by a processor associated with a battery electric machine (BEM) allocated to a production circuit, the method comprising:
   determining a location of the BEM;
   determining a location of a charging station compatible with the BEM;
   based at least in part on the location of the BEM, the location of the charging station, and the production circuit:
      determining a plurality of tasks of the BEM for executing the production circuit,
      predicting a corresponding duration of each task of the plurality of tasks,
      predicting a corresponding energy use of each task of the plurality of tasks,
      predicting corresponding start and end times of each task of the plurality of tasks, and
      determining a sequence of the plurality of tasks;
   initiating the BEM to perform a next task of the plurality of tasks, the next task being a task after a current task of the plurality of tasks; and
   minimizing a startup time period between an exit time prior to the predicted corresponding end time of the current task and the predicted corresponding start time of the next task by causing the BEM to initiate exiting a low power mode of operation of the BEM at the exit time based in part on:
      the predicted corresponding duration and the predicted corresponding energy use of the current task, and
      the predicted corresponding duration and the predicted corresponding energy use of the next task.

2. The method of claim 1, wherein determining the plurality of tasks includes determining the plurality of tasks based on at least of:
   one or more routine tasks of the BEM associated with the production circuit, or
   one or more tasks historically performed by the BEM associated with the production circuit.

3. The method of claim 1, wherein predicting the corresponding duration of each task of the plurality of tasks includes:
   predicting the corresponding duration based at least in part on a behavior of an operator of the BEM.

4. The method of claim 1, wherein predicting the corresponding energy use of each task of the plurality of tasks includes:
   predicting the corresponding energy use based at least in part on a behavior of an operator of the BEM.

5. The method of claim 1, wherein predicting the corresponding energy use of each task of the plurality of tasks includes:
  segmenting the predicted corresponding duration into a plurality of time intervals, and
  predicting a corresponding segment energy use of each time interval of the plurality of time intervals.

6. The method of claim 1, wherein predicting the corresponding energy use of each task of the plurality of tasks includes using at least one of:
  a heuristic algorithm for estimating the corresponding energy use of each task of the plurality of tasks,
  a simulation of the plurality of tasks for estimating the corresponding energy use of each task of the plurality of tasks,
  a stochastic model for estimating the corresponding energy use of each task of the plurality of tasks, or
  a machine learning for estimating the corresponding energy use of each task of the plurality of tasks.

7. The method of claim 1, wherein the exit time is determined based at least in part on the predicted corresponding energy use of the next task.

8. The method of claim 1, wherein the exit time prior to the predicted end time of the current task provides at least one of:
  a minimal energy use between the exit time and the predicted corresponding end time of the current task, and
  a minimal damage to batteries of the BEM between the exit time and the predicted corresponding end time of the current task.

9. The method of claim 1, wherein the exit time prior to the predicted end time of the current task is determined based on one or more machine states of the BEM, the one or more machine states including at least one of:
  ambient temperature,
  temperature of batteries of the BEM,
  health of the batteries,
  charge capacity of the BEM,
  information from machines near the BEM,
  performance history of the BEM, and
  predicted energy use by the BEM between the exit time and the predicted end time of the current task.

10. The method of claim 1, wherein the exit time prior to the predicted corresponding end time of the current task is determined using at least one of:
  a heuristic algorithm for estimating the exit time based on one or more machine states of the BEM,
  a simulation of the exit time based on the one or more machine states of the BEM,
  a stochastic model for estimating the exit time based on the one or more machine states of the BEM, or
  a machine learning for estimating the exit time based on the one or more machine states of the BEM.

11. The method of claim 1, wherein causing the BEM to initiate exiting the low power mode at the exit time prior to the predicted corresponding end time of the current task includes:
  delaying causing the BEM to initiate exiting the low power mode based on safety associated with the BEM at the exit time.

12. The method of claim 1, wherein causing the BEM to initiate exiting the low power mode of operation of the BEM includes:
  preparing one or more components of the BEM to be ready to start the next task at the predicted corresponding start time of the next task.

13. A system comprising:
  a processor of an electronic control module (ECM) of a battery electric machine (BEM) allocated to a production circuit; and
  a memory of the ECM communicatively coupled to the processor, the memory storing thereon processor-executable instructions that, when executed by the processor, cause the processor to:
    determine a location of a battery electric machine (BEM) the BEM allocated to a production circuit;
    determine a location of a charging station compatible with the BEM;
    based at least in part on the location of the BEM, the location of the charging station, and the production circuit:
      determine a plurality of tasks of the BEM for executing the production circuit,
      predict a corresponding duration of each task of the plurality of tasks,
      predict a corresponding energy use of each task of the plurality of tasks including:
        segmenting the corresponding duration into a plurality of time intervals, and
        predicting a corresponding segment energy use of each time interval of the plurality of time intervals,
      predicting corresponding start and end times of each task of the plurality of tasks, and
      determine a sequence of the plurality of tasks;
    initiate the BEM to perform a next task of the plurality of tasks, the next task being a task after a current task of the plurality of tasks; and
    minimize a startup time period between an exit time prior to the predicted corresponding end time of the current task and the predicted corresponding start time of the next task by causing the BEM to initiate exiting a low power mode of operation of the BEM at the exit time based in part on:
      the predicted corresponding duration and the predicted corresponding energy use of the current task, and
      the predicted corresponding duration and the predicted corresponding energy use of the next task.

14. The system of claim 13, wherein the processor-executable instructions further cause the processor to predict a corresponding energy use, a corresponding start time, and a corresponding end time of each task of the plurality of tasks by using at least one of:
  a heuristic algorithm for estimating the corresponding energy use of each task of the plurality of tasks,
  a simulation of the plurality of tasks for estimating the corresponding energy use of each task of the plurality of tasks,
  a stochastic model for estimating the corresponding energy use of each task of the plurality of tasks, or
  a machine learning for estimating the corresponding energy use of each task of the plurality of tasks.

15. The system of claim 14, wherein:
the exit time prior to the predicted corresponding end time of the current task is determined using at least one of:
  a heuristic algorithm for estimating the exit time based on one or more machine states of the BEM,
  a simulation of the exit time based on the one or more machine states of the BEM,
  a stochastic model for estimating the exit time based on the one or more machine states of the BEM, or a machine learning for estimating the exit time based on the one or more machine states of the BEM.

16. The system of claim 15, wherein the processor-executable instructions further cause the processor to determine the exit time based on one or more machine states of the BEM, the one or more machine states including at least one of:
- ambient temperature,
- temperature of batteries of the BEM,
- health of the batteries,
- charge capacity of the BEM,
- information from machines near the BEM,
- performance history of the BEM, and
- predicted energy use by the BEM between the exit time and the predicted end time of the current task.

17. The method of claim 11, wherein delaying causing the BEM to initiate exiting the low power mode based on safety associated with the BEM at the exit time includes detecting an obstacle present in a path of the BEM.

18. Non-transitory computer-readable medium storing thereon processor-executable instructions that, when executed by a processor of a system associated with a battery electric machine (BEM) allocated to a production circuit, cause the processor to perform operations, the operations comprising:
- determining a location of the BEM;
- determining a location of a charging station compatible with the BEM;
- based at least in part on the location of the BEM, the location of the charging station, and the production circuit:
  - determining a plurality of tasks of the BEM for executing the production circuit,
  - predicting a corresponding duration of each task of the plurality of tasks,
  - predicting a corresponding energy use of each task of the plurality of tasks including:
    - segmenting the corresponding duration into a plurality of time intervals, and
    - predicting a corresponding segment energy use of each time interval of the plurality of time intervals,
  - predicting corresponding start and end times of each task of the plurality of tasks, and
  - determining a sequence of the plurality of tasks;
- initiating the BEM to perform a next task of the plurality of tasks, the next task being a task after a current task of the plurality of tasks; and
- minimizing a startup time period between an exit time prior to the predicted corresponding end time of the current task and the predicted corresponding start time of the next task by causing the BEM to initiate exiting a low power mode of operation of the BEM at the exit time based in part on:
  - the predicted corresponding duration and the predicted corresponding energy use of the current task, and
  - the predicted corresponding duration and the predicted corresponding energy use of next task.

19. The non-transitory computer-readable medium of claim 18, wherein predicting the corresponding energy use of each task of the plurality of tasks is based on at least one of:
- a heuristic algorithm for estimating the corresponding energy use of each task of the plurality of tasks,
- a simulation of the plurality of tasks for estimating the corresponding energy use of each task of the plurality of tasks,
- a stochastic model for estimating the corresponding energy use of each task of the plurality of tasks, or
- a machine learning for estimating the corresponding energy use of each task of the plurality of tasks.

20. The non-transitory computer-readable medium of claim 19, wherein the exit time is determined using at least one of:
- a heuristic algorithm for estimating the exit time based on one or more machine states of the BEM,
- a simulation of the exit time based on the one or more machine states of the BEM,
- a stochastic model for estimating the exit time based on the one or more machine states of the BEM, or
- a machine learning for estimating the exit time based on the one or more machine states of the BEM.

* * * * *